US012574604B2

(12) United States Patent
Holland et al.

(10) Patent No.: US 12,574,604 B2
(45) Date of Patent: Mar. 10, 2026

(54) PROGRAM GUIDE WITH SPOILER PREVENTION

(71) Applicant: Sling TV L.L.C., Englewood, CO (US)

(72) Inventors: Kevin Holland, Denver, CO (US); Seth VanSickel, Parker, CO (US); Jonathan Lin, Denver, CO (US); Liam Richardson, Parker, CO (US); Amit Kumar, Centennial, CO (US)

(73) Assignee: Sling TV L.L.C., Englewood, CO (US)

( * ) Notice: Subject to any disclaimer, the term of this patent is extended or adjusted under 35 U.S.C. 154(b) by 55 days.

(21) Appl. No.: 18/421,787

(22) Filed: Jan. 24, 2024

(65) Prior Publication Data
US 2024/0414403 A1 Dec. 12, 2024

Related U.S. Application Data

(60) Provisional application No. 63/507,375, filed on Jun. 9, 2023.

(51) Int. Cl.
*H04N 21/475* (2011.01)
*H04N 21/482* (2011.01)
(52) U.S. Cl.
CPC ....... *H04N 21/4755* (2013.01); *H04N 21/482* (2013.01)

(58) Field of Classification Search
CPC ............. H04N 21/47; H04N 21/47214; H04N 21/4755; H04N 21/482
See application file for complete search history.

(56) References Cited

U.S. PATENT DOCUMENTS

| | | | |
|---|---|---|---|
| 2015/0382061 A1* | 12/2015 | Maisenbacher .... | H04N 21/4542 725/28 |
| 2016/0191999 A1* | 6/2016 | Friedrich ........... | H04N 21/4821 725/39 |

* cited by examiner

*Primary Examiner* — Rong Le
(74) *Attorney, Agent, or Firm* — Kilpatrick Townsend & Stockton LLP

(57) ABSTRACT
Systems and methods related to improved program guide are provided. In one example, a method includes: receiving a first user request for browsing a program guide for digital programs on a client device, transmitting data corresponding to the program guide to the client device, and displaying the program guide in a user interface. The program guide includes multiple program preview boards, and each program preview board corresponds to a digital program or a recorded digital program and includes information related to the digital program or the recorded digital program. The method further includes providing a first selectable option for the user to enable or disable a first spoiler prevention feature and enabling or disabling the first spoiler prevention feature based on the user's selection. The first spoiler prevention feature is configured to hide a part of the information related to the digital program in the corresponding program preview.

20 Claims, 12 Drawing Sheets

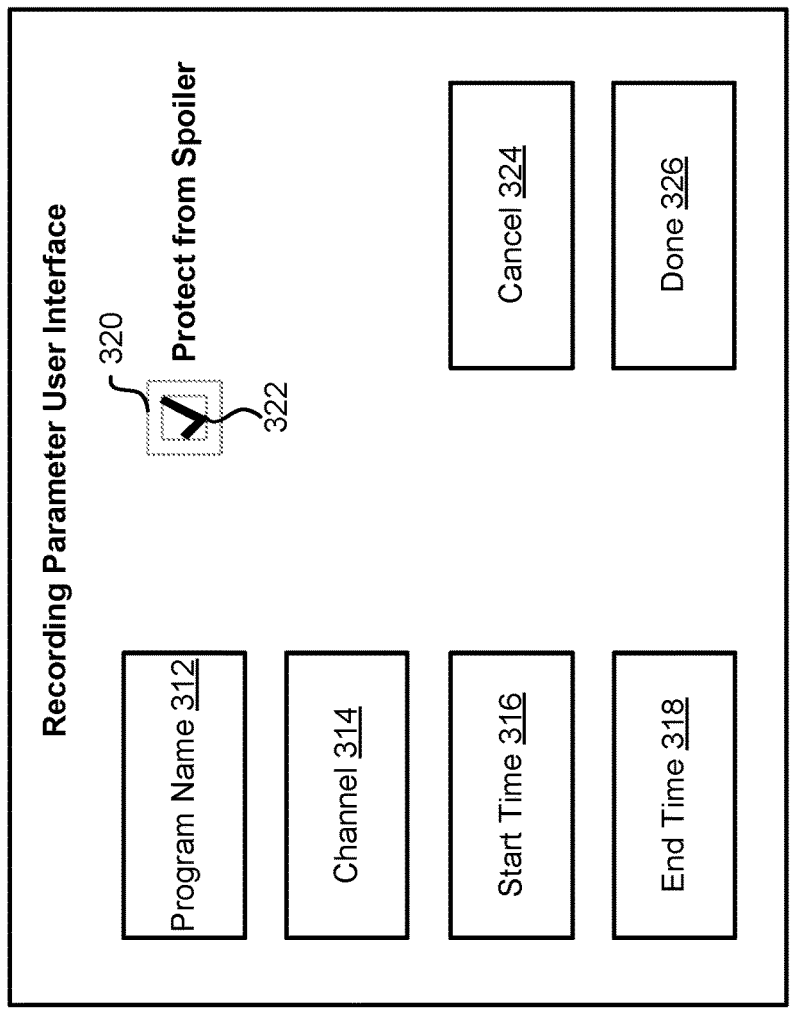
FIG. 3B

300C

330

Spoiler Prevention User Interface

332

SPOILER ALERT!
This recorded program may contain spoiler. Please select one of the options below.

334

Option 1: Watch the recorded program with spoiler prevention

336

Option 2: Watch the recorded program with spoiler

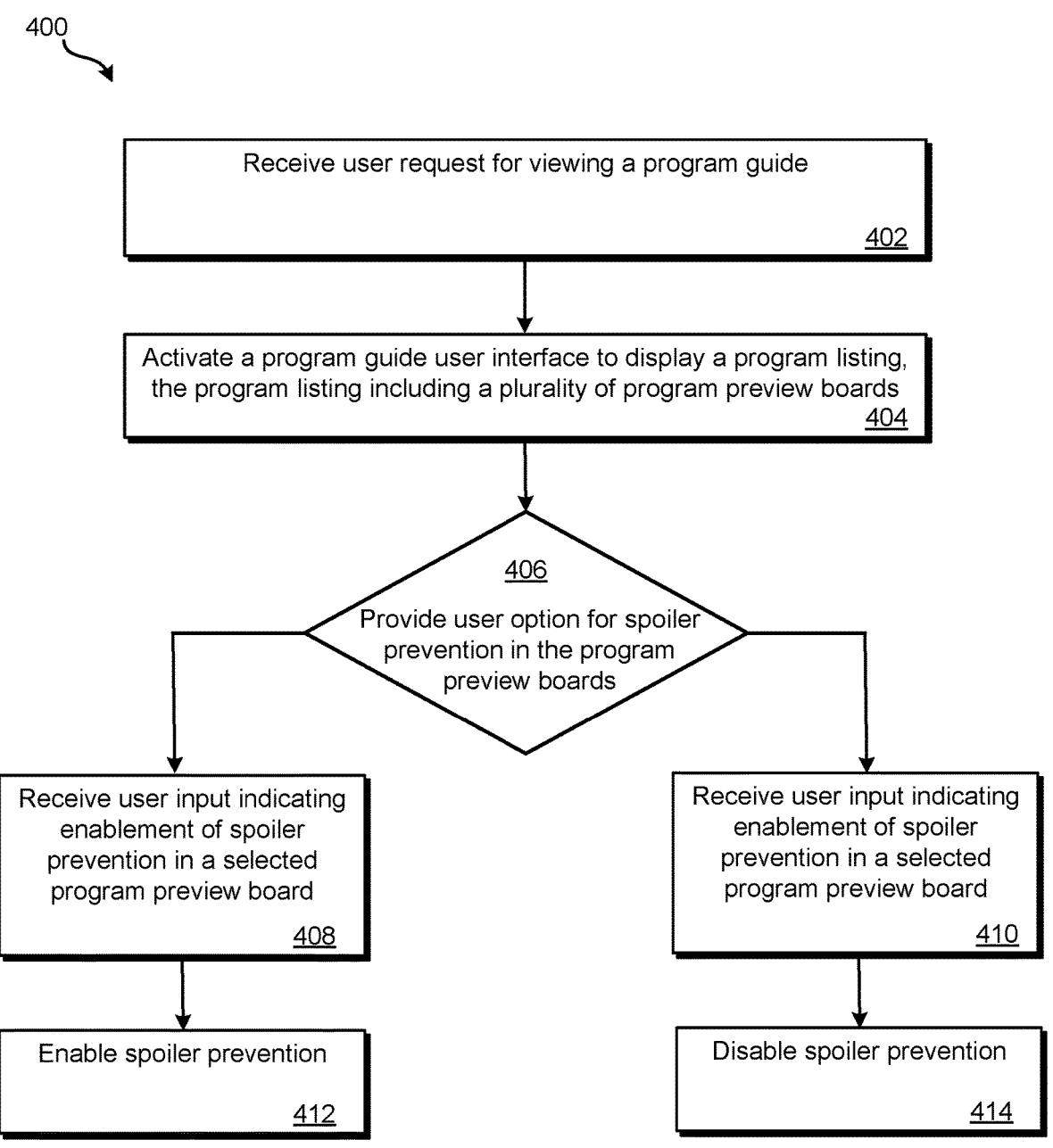

400

Receive user request for viewing a program guide

402

Activate a program guide user interface to display a program listing, the program listing including a plurality of program preview boards

404

406

Provide user option for spoiler prevention in the program preview boards

Receive user input indicating enablement of spoiler prevention in a selected program preview board

408

Receive user input indicating enablement of spoiler prevention in a selected program preview board

410

Enable spoiler prevention

412

Disable spoiler prevention

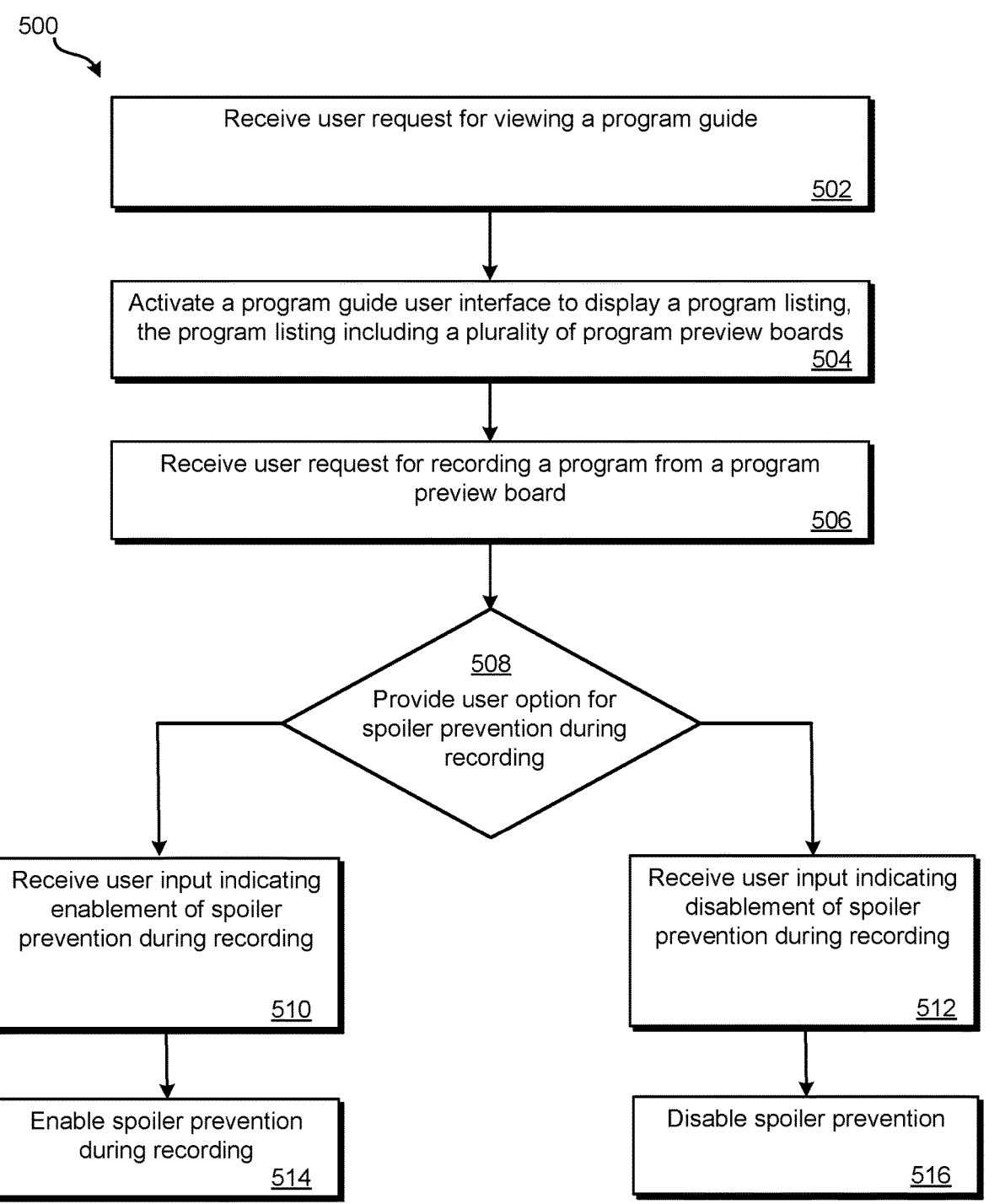

500

Receive user request for viewing a program guide

502

Activate a program guide user interface to display a program listing, the program listing including a plurality of program preview boards

504

Receive user request for recording a program from a program preview board

506

508
Provide user option for spoiler prevention during recording

Receive user input indicating enablement of spoiler prevention during recording

510

Receive user input indicating disablement of spoiler prevention during recording

512

Enable spoiler prevention during recording

514

Disable spoiler prevention

PROGRAM GUIDE WITH SPOILER PREVENTION

CROSS REFERENCE TO RELATED APPLICATIONS

This application claims priority to U.S. Provisional Patent Application No. 63/507,375, filed on Jun. 9, 2023, the disclosure of which is incorporated by reference in its entirety for all purposes.

BACKGROUND

Digital program guides (or program guides) are applications used within multimedia devices, such as digital set-top boxes, smart devices (e.g., smart TVs), and other devices that are capable of displaying multimedia via satellite, broadband, and/or the Internet. A program guide may provide an organizational layout that shows current and scheduled programs for viewing on live TV, available programs to stream via the Internet, and/or programs that have been previously recorded (e.g., using a digital video recorder (DVR)).

A program guide may be implemented in a user interface (UI) and displayed on a client device. The program guide may be useful for the users (e.g., viewers) to browse various sport game programs on the user interface. Conventionally, the program guides are often designed to display the real-time scores, final scores, or other information regarding the sport game for each of the sport game programs. However, when users are browsing the sport games before selecting a sport game program to watch, seeing the scores beforehand can spoil the excitement and suspense of watching the game. It eliminates the element of surprise and makes the viewing experience less enjoyable for those who prefer to experience the game as it unfolds. Particularly, some users may prefer to record a game displayed in the program guide and watch the recorded game later. Knowing the score from the program guide in advance takes away the thrill of uncertainty and suspense that comes with watching that game program. Viewers may lose interest or find it less engaging if they already know the outcome. If viewers already know the score, the replay value of the recorded game may decrease significantly. Re-watching a game is often done to relive the excitement and analyze key moments, but knowing the outcome can make the replay less meaningful. Thus, there is a need to provide a program guide with an option for enablement of spoiler prevention feature.

SUMMARY

According to some embodiments of the present disclosure, a method for spoiler prevention is provided. In one example, the method includes: receiving a first user request for browsing a program guide for digital programs on a client device, transmitting data corresponding to the program guide to the client device, and displaying the program guide in a user interface. The program guide includes multiple program preview boards, and each program preview board corresponds to a digital program or a recorded digital program and includes information related to the digital program or the recorded digital program. The method further includes providing a first selectable option for the user to enable or disable a first spoiler prevention feature, and enabling or disabling the first spoiler prevention feature based on the user's selection. The first spoiler prevention feature is configured to hide a part of the information related to the digital program in the corresponding program preview board.

According to some embodiments of the present disclosure, a system for spoiler prevention is provided. In one example, the system includes: one or more processors and a computer-readable storage media storing computer-executable instructions. The computer-executable instructions, when executed by the one or more processors, cause the system to: receive a first user request for browsing a program guide for digital programs on a client device, in response to the first user request, transmit data corresponding to the program guide to the client device, and display the program guide to allow the user to browse the program guide in a user interface. The program guide includes multiple program preview boards, and each program preview board corresponds to a digital program or a recorded digital program and includes information related to the digital program or the recorded digital program. The instructions, when executed by the one or more processors, further cause the system to: provide a first selectable option for the user to enable or disable a first spoiler prevention feature, and enable or disable the first spoiler prevention feature, based on the user's response the first selectable option. The first spoiler prevention feature is configured to hide at least a part of the information related to the digital program in the corresponding program preview board.

In accordance with some embodiments, the present disclosure also provides a non-transitory machine-readable storage medium encoded with instructions, the instructions executable to cause one or more electronic processors of a system to: receive a first user request for browsing a program guide for digital programs on a client device, in response to the first user request, transmit data corresponding to the program guide to the client device, and display the program guide to allow the user to browse the program guide in a user interface. The program guide includes multiple program preview boards, and each program preview board corresponds to a digital program or a recorded digital program and includes information related to the digital program or the recorded digital program. The instructions, when executed by the one or more processors, further cause the system to: provide a first selectable option for the user to enable or disable a first spoiler prevention feature, and enable or disable the first spoiler prevention feature, based on the user's response the first selectable option. The first spoiler prevention feature is configured to hide at least a part of the information related to the digital program in the corresponding program preview board.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 2A, 2B, 2C, and 2D are schematic diagrams illustrating screenshots of an example user interface, according to various embodiments.

FIGS. 3A, 3B, and 3C are schematic diagrams illustrating screenshots of example user interfaces, according to various embodiments.

FIG. 4 is a flow diagram illustrating an example method for spoiler prevention, according to various embodiments.

FIG. 5 is a flow diagram illustrating another example method for spoiler prevention, according to various embodiments.

DETAILED DESCRIPTION

The present disclosure generally relates to systems, devices, and methods for digital program guide. Such systems and techniques may be useful, for example, in preventing spoiler for program guiding, streaming, and/or recording.

One insight provided in the present disclosure is related to an improved program guide that provides users an option to hide or block out scores of a sport game displayed in the program guide. By using a spoiler prevention feature or function to block out scores, the program guide allows users to maintain the suspense and excitement of when they are browsing the game programs before selecting a particular game program to watch or record. Particularly, when a sport game program displayed in the program guide has not been purchased by the user, hiding the score may contribute to enhancing the overall appeal of the game program and provide additional value to potential buyers. By providing a spoiler prevention feature, the program guide can attract users who prioritize the excitement of watching a game unfold in real-time or who prefer to record and watch games at their convenience without prior knowledge of the outcome.

Another insight provided in the present disclosure is related to a spoiler prevention feature or function that allows the user to record the sport program and watch the recorded sport program with an option to hide the score at the beginning of, during, and/or after recording. As mentioned above, users who record the game without knowing the score can immerse themselves in the game without any prior knowledge of the outcome. This preserves the suspense and keeps them engaged, as they are constantly wondering about the final result. Watching a recorded game without knowing the score allows users to appreciate the game's nuances and details. Users can focus on the strategies, player performances, and key moments without being influenced by the outcome. This leads to a more immersive and enjoyable viewing experience. The spoiler prevention function further allows users to watch the recorded game at their convenience without worrying about accidental spoilers. Users have the freedom to choose when to watch the game without the fear of having the result revealed before they are ready. Further, the spoiler prevention feature enhances the replay value of the recorded sport program. Users can re-watch the recorded sport program multiple times, analyzing different aspects and uncovering new details without losing the surprise factor.

Figure 1:
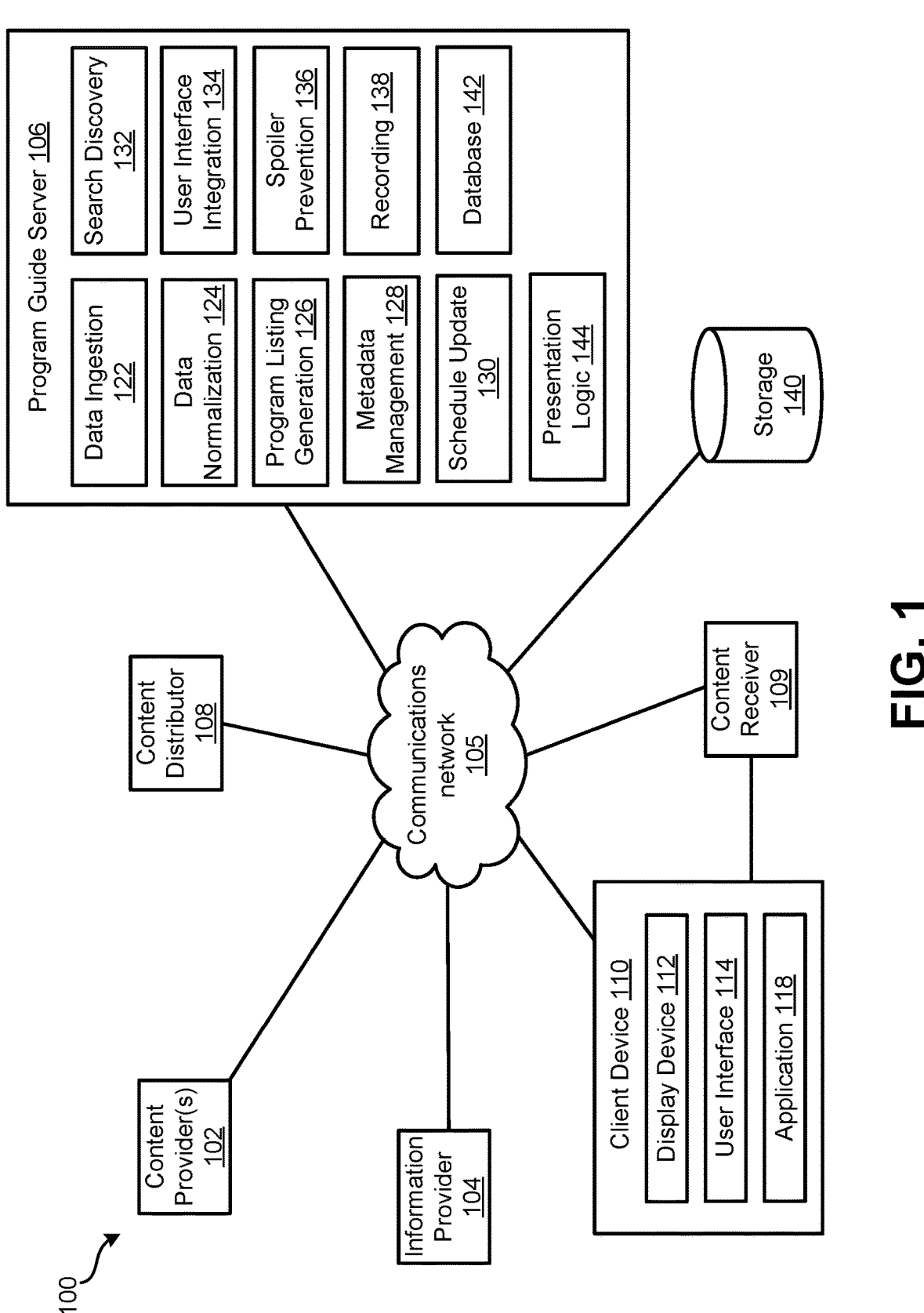
FIG. 1 is a schematic diagram illustrating an example of a media delivery system for provisioning digital programs to users, according to various embodiments.

FIG. 1 is a schematic diagram illustrating an example of a media delivery system 100 (also referred to as "system 100") for provisioning digital programs to users, according to various embodiments. In the illustrated example, the system 100 includes, among other components, one or more content providers 102, one or more information providers 104, a program guide server 106, a content distributor 108, a content receiver 109, a client device 110, a storage 140, and a communications network 105. Each component may include a software component, a hardware component, or a combination of both. Various components included in the system 100 are communicatively connected to each other via the communications network 105.

The content providers 102 (e.g., ABC, CBS, NBC, HBO, ESPN) and other information providers 104 (e.g., guide services) provide program content (e.g., audio/video/data included in digital programs) and related information (e.g., digital program guide data) via the communication network 105 to a content distributor 108. The content distributor 108 combines signals including the program content and related information into a signal that is transmitted to the content receiver. Content distribution and digital transmission can be either over-the-air (OTA) or over-the-top (OTT). OTA transmission refers to broadcasting television signals over the airwaves using radio frequencies, which involves transmitting TV signals from a broadcast station, such as a local network affiliate, to the viewers' television antennas. OTT transmission refers to the delivery of media content over the Internet directly to content receiver 109 and client device 110, bypassing broadcast or cable television infrastructure. For illustrative purposes, an example of an OTA device is AirTV by AirTV L.L.C, a wholly owned subsidiary of DISH Network Corporation, Englewood, Colo., and an example of an OTT service is Sling Television (commonly known as SlingTV) by Sling TV L.L.C., Englewood, Colo., a wholly owned subsidiary of Dish Network Corporation.

The program guide server 106 is generally configured to generate program guides and provide the program guide to the users for the user to browse various television or media programs and select a particular program for watching or recording. In the illustrated example, the program guide server 106 includes, among other components, a data ingestion component 122, a data normalization component 124, a program listing generation component 126, a metadata management component 128, a schedule update component 130, a search and discovery component 132, a user interface integration component 134, a spoiler prevention component 136, a recording component 138, a database 142, and a presentation logic 144.

The data ingestion component 122 is configured to receive data feeds from multiple sources, such as content providers 102 and information providers 104, and other data providers. These data feeds contain program contents, schedules, metadata, and updates. The data ingestion component 122 is further configured to processes and ingests the received data and ensure the program guide's accuracy and timeliness. In some embodiments, the data ingestion component 122 is configured to receive data feeds related to a sport game or event from the content provider 102 and the real-time score and final score of the sport game from the information provider 104 and integrate the real-time score to data feed of the sport game.

The data normalization component 124 is configured to parses the received data feeds, extracting relevant information and normalizing it into a consistent format. Data normalization may be achieved by organizing the data according to predefined standards, such as a specific data schema or industry-standard formats like XML or JSON.

The program listing generation component 126 is configured to generate program listings (also referred to as "ribbons") for different channels and time slots, based on the type of the programs. These program listings are typically organized in a ribbon format either horizontally or vertically arranged in a user interface, providing users with a structured view of the available programs across various channels or resources. In some embodiments, the program listing generation component 126 is further configured to generate multiple visual scoreboards for each sport program, and the visual scoreboard may display or hide the real-time score and/or the final score of the alive sport game, based on users' selection.

The metadata management component 128 is configured to manage metadata associated with each program, such as title, description, cast information, episode details, and ratings. This metadata enhances the program guide's functionality by providing additional information about the programs, enabling search capabilities, and facilitating personalized recommendations. Selected information from the metadata may also be displayed in the program guide in the user interface. For example, the sport game information such as the team, player, schedules, status, broadcasting channel may be included in the scoreboard or the program list (i.e., the ribbon) as mentioned above.

The schedule update component 130 is configured to continuously monitor for updates and changes to program schedules. The schedule update component 130 can be used to reflect the most current and accurate information by incorporating real-time updates and handling any schedule changes, including program cancellations, time shifts, or additions. Update information can be timely displayed in the program list for users to browse.

The search and discovery component 132 is configured to enable users to find specific programs based on criteria like genre, keywords, actors, players, or specific time slots, and quickly locate desired content within the program guide.

The user interface integration component 134 is configured to provide a user interface or API that allows the program guide to be accessed and displayed on various client devices, such as television set-top boxes, smart TVs, mobile applications, or web interfaces. The user interface integration component 134 enables users to navigate and interact with the program guide to explore program listings, set reminders, or schedule recordings. The user interface integration component 134 may be further used to visualize the various programs (e.g., program guide pages, program listings, ribbons, or scoreboards for sport programs, etc.) in the user interface. The user interface and various visual components thereof generated by the user interface integration component 134 may be transmitted to the client device 110 to allow the users to view and interact with the user interface. More examples of the user interface will be described below with references to FIGS. 2A-2D.

The spoiler prevention component 136 is configured to provide users with customizable options, filters, and alerts, upon user request or selection, to prevent or minimize the exposure to critical information. The spoiler prevention component 136 may include a spoiler prevention logic configured to manipulate the virtual display of information related to the program in the program preview board. For example, actual or real-time or final scores can be overlaid or replaced with a placeholder or obscured content, such as question marks, dashes, symbols, or blank spaces in the scoreboard.

In some embodiments, the spoiler prevention component 136 further includes a content categorization module, a spoiler identification module, a spoiler metadata tagging module, a score blocking module, a synopsis avoidance module, a highlighting spoiler warning module, and a real-time update module. These modules of the spoiler prevention component 136 integrate with the user interfaces of the program guide (e.g., an application executed on a set-top box, streaming application, or web interface, etc.). The spoiler prevention component 136 could provide a seamless experience for users, applying spoiler prevention measures within the user interface's design and functionality.

In some embodiments, the content categorization module categorizes different types of content, such as TV shows, movies, sports events, or other programs. The content categorization module allows the server to apply specific spoiler prevention rules based on the content type. The spoiler prevention rules may be pre-determined and stored in the database 142. The spoiler identification module utilizes pre-determined algorithms or rules to identify potential spoilers within program descriptions, summaries, metadata, or any real-time information/updated related to the program. The spoiler identification module may analyze keywords, phrases, or patterns that indicate the presence of spoiler information. The spoiler prevention metadata/information tagging module are used to assign various spoiler metadata/information tags assigned to specific programs that contain significant spoiler-related content (such as the score, key players, etc.). These metadata/information tags help in alerting users or applying spoiler prevention measures.

The score blocking module can block the display of scores or results in the program listings, ribbons, and scoreboard. This prevents users from accidentally seeing the outcome of a game before the users have a chance to watch it and/or before the users record the program. The synopsis avoidance module can provide an option to hide or truncate detailed synopses or descriptions of episodes or movies that contain spoilers. Users who want to avoid spoilers can choose to see only basic information about the content without revealing key plot points. The highlighting spoiler warning module can highlight or visually mark content that may contain spoilers. For example, when displaying program information or summary, the spoiler prevention component 136 can alert users to potential spoilers (e.g., the real-time or final score of a particular sport game), giving them the option to avoid reading or accessing that specific information. The real-time update module can receive real-time updates or notifications from content providers 102 and/or information providers 104 to ensure that the latest information is considered for spoiler prevention, which could help keep the module's spoiler prevention mechanisms up to date and relevant.

The recording component 138 of the program guide server 106 is configured to record a program and provide the recorded program to the user, upon user request. The recording component 138 is also configured to provide users options to prevent spoiler for recording and implement spoiler prevention measures for presentation of the recorded content.

In some embodiments, the recording component 138 includes a recorder. The recorder may be a hardware component used for receiving and decoding signals defining a digital or medial content of a program, recording the program, and store a copy of the program in the storage 140. The storage 140 may be a network-attached storage (NAS) or a cloud-based storage. One or more NAS devices can be connected to the network (e.g., cloud) and provide centralized storage that can be accessed by multiple devices. The NAS devices may be integrated with the program guide server to store recorded programs. The recording component 138 may be integrated to the user interface to provide a seamless and intuitive experience for users to schedule, manage, and access their recorded programs with the option for spoiler prevention.

In some embodiments, a separate recorder in communication with the program guide server 106 is included in the system 100. The separate recorder may be a part of the content receiver 109 and in a form of an OTT recorder or a digital video recorder (DVR). The separate recorder, when executing an instruction from the recording component 138 of the program guide server 106, may record a particular program upon a user request, and transmitting the recorded content to the program guide server 106. The program guide server 106 then integrates the spoiler prevention measures to the recorded content upon user request and store the recorded content in the storage 140.

The program guide server 106 may further include a presentation logic 144 configured to handle the visual representation and user interaction aspects of the program guide user interface. The presentation logic 144 determines how the information is presented to the user, manages the layout and formatting of the visual elements included in the user interface, and handles user inputs and interactions. In some embodiments, the presentation logic 144 further includes a user interface rendering module, a layout management module, a user input handling module, an interaction flow module, and an integration module. The user interface rendering module is configured to format the program listings, schedule information, program details, and other relevant information to be displayed on the client device 110. The layout management module is configured to manage the arrangement and positioning of visual components or elements (e.g., listing, ribbon, scoreboard) within the program guide user interface. The user input handling module captures and interprets user inputs from the client device 110, such as button presses, toggles, clicks, touch gestures, or voice commands. The user input handling module can determine the appropriate actions to be taken based on these inputs, such as selecting a program, scheduling a recording, or navigating through menus. The interaction flow module is configured to define the flow and navigation within the program guide interface and determine how users can browse through program listings, access program details, schedule recordings, view recorded content, and switch between different sections or views within the user interface. The integration module is configured to execute in conjunction with other components of the program guide server 106, such as the database 142, recording component 138, spoiler prevention component 136, and external data/information providers. The integration module retrieves and manipulates data from these components to present the relevant information to the user and enable the desired functionality.

The client device 110 may be a smartphone, a tablet, a television, a computer, game console, etc., on which a program guide application is executed, and a user interface according to the present disclosure is displayed to allow the users to view and interact with the program guide via a user interface. In some embodiments, the client device 110 is integrated with the content receiver 109.

In some embodiments, the client device 110 includes, among other components, a display device 112, a user interface module 114, and a program guide application 118. The display device 112 includes the necessary hardware and software capabilities that allow the user to view the program guide, content of alive programs (e.g., TV channels), and content of the recorded content. The user interface module

114 is configured to receive a user interface from the program guide server 106 to display the program guide on the display device. The user interface module 114 is also configured to facilitate communication and interaction between the client device 110 with various components (e.g., the program guide server 106) of the system 100. The program guide application 118 provides the user interface for accessing program listings, schedules, and recorded content, browsing, searching, and interacting with the program guide server 106. The program guide application 118 of the client device 110 may also have the spoiler prevention feature integrated, which helps prevent exposure to scores, results, or other spoilers while navigating program listings or viewing recorded content.

The client device 110 may further include other hardware or software components such as a playback application, network communication protocols, an operating system, a security and digital rights management (DRM) module, a memory device, and others.

FIG. 2 is a schematic diagram illustrating an example screenshot of a program guide user interface 200A, according to various embodiments. The program guide user interface 200A includes various visual elements. As an example for illustrative purpose only, the program guide user interface 200A is displayed on the client device 110 as a program listing page or a home page of sport programs. It should be understood that multiple home pages may be included in the program guide user interface 200A, and multiple program listings may be included in each home page. In the illustrated example of FIG. 2, the program guide user interface 200A includes a home page 202, a program listing title 204, multiple program listings including a first program listing (or ribbon) 206, a second program listing 210, and at least one program preview board 212 included in the second program listing 210. Each of these visual elements occupies a display area in the program guide user interface 200A.

The home page 202 may include visual components related to a particular type or genre of program. In some embodiments, the programs in the home page 202 are all related to sport games or sport events. The program listing title 204 (or home page title 204) provide users with sufficient information to understand what the programs are about and distinguish the programs listed in the home page 202 from other programs in different types or genres. In some embodiments, the home page 202 and program listing title 204 can be customized or personalized by users, and users can also choose what programs to be included in the home page and program listing 2206 and 210, based on their preferences. For example, the program guide server 106 can analyze user viewing patterns, search history, ratings, or feedback to provide personalized program recommendations. The program guide server 106 can also provide individualized program listings based on the user's location, subscription information, authentication and authorization statues, or selected preferences. The program guide server 106 can also provide options for the users to create personalized user profiles, which can be used to store viewing preferences, favorite genres, or saved programs, and enable a personalized experience across multiple devices or sessions.

The first program listing 206 (i.e., the first ribbon) is a virtual navigation tool and include multiple channel names 208. The first program listing 206 allows users to easily locate and access programs according to specific channels names 208. The channel list or ribbon can be arranged horizontally or vertically, either as a separate section or as part of the program guide user interface 200A. The first program listing displays the names of different channels in a structured format, allowing users to scroll or navigate through the list to find the desired channel. In the illustrated example, the first program listing 206 includes sport channels 208 that provide various sport games or events, such as National Basketball Association (NBA), National Football League (NFL), National Collegiate Athletic Association (NCAA), Hrvatska nogometna liga (HNL) or Croatian Football League, Major League Baseball (MLB), etc. It should be noted that the example channel names mentioned above are full names of the leagues or associations associated with the sports, rather than specific TV channels. The actual TV channels that broadcast these sports may vary depending on the region and broadcasting rights. Examples of TV channels that often broadcast these sports include ESPN, NBC Sports, Fox Sports, CBS Sports, and so on. The names of the specific TV channels may also be listed in the first program list 206.

The second program listing 210 (i.e., the second ribbon 210) is also a virtual navigation tool and include multiple program preview boards 212 (i.e., 212a, 212b, 212c, 212d, 212e, etc.) each providing a summary with more detailed information of each program provided by a particular channel included in the first program listing 206. In some embodiments, the program preview board 212 is in a form of a scoreboard. The scoreboard may include information regarding a sport program (e.g., a sport game or event), such as a game status indicator 216, the channel name 208 that provides content of the game program, an indicator 218 of accessibility (i.e., lock/unlock status), a team section 222, and a score section 224.

The game status indicator 216 displays the current status of the sport program and helps viewers understand the real-time progress of the sport program. For example, the game status indicator 216 may indicate whether the game is alive (i.e., in progress), has concluded, or is in a specific phase (e.g., halftime, overtime). The channel name 208 corresponds to a specific channel provided in the first program listing 206 and specifies the name or logo of the channel that is broadcasting the sport program. The channel name 208 informs viewers which channel they should tune in to in order to access the content of the sport program. The accessibility indicator 218 indicates whether the sport program is accessible or not, or whether the user is entitled to the content of the sport program or not. The accessibility indicator 218 may show a lock symbol if the program requires a subscription or is subject to blackout restrictions, or an unlock symbol if the program is freely accessible to the viewers, based on the subscription status of the viewers. The team section 222 provides information about the participating teams in the sport game or event and displays the team names or logos, allowing viewers to identify the teams involved in the sport program. In some embodiments, additional details like team records, rankings, or other relevant information may be included. The score section 224 displays the scores of the competing teams or participants. The scores can include real-time score, final score, or result of the sport game or event, allowing viewers to keep track of the scoring progress and identify the leading or trailing team. Additional information may be included in the scoreboards. The scoreboard may be arranged either horizontally or vertically in the second program listing 210. Both the first program listing 206 and the second program listing 210 can be customizable by the users, and their visual design and effect can be personalized by the users according to their preferences.

Figure 2A:
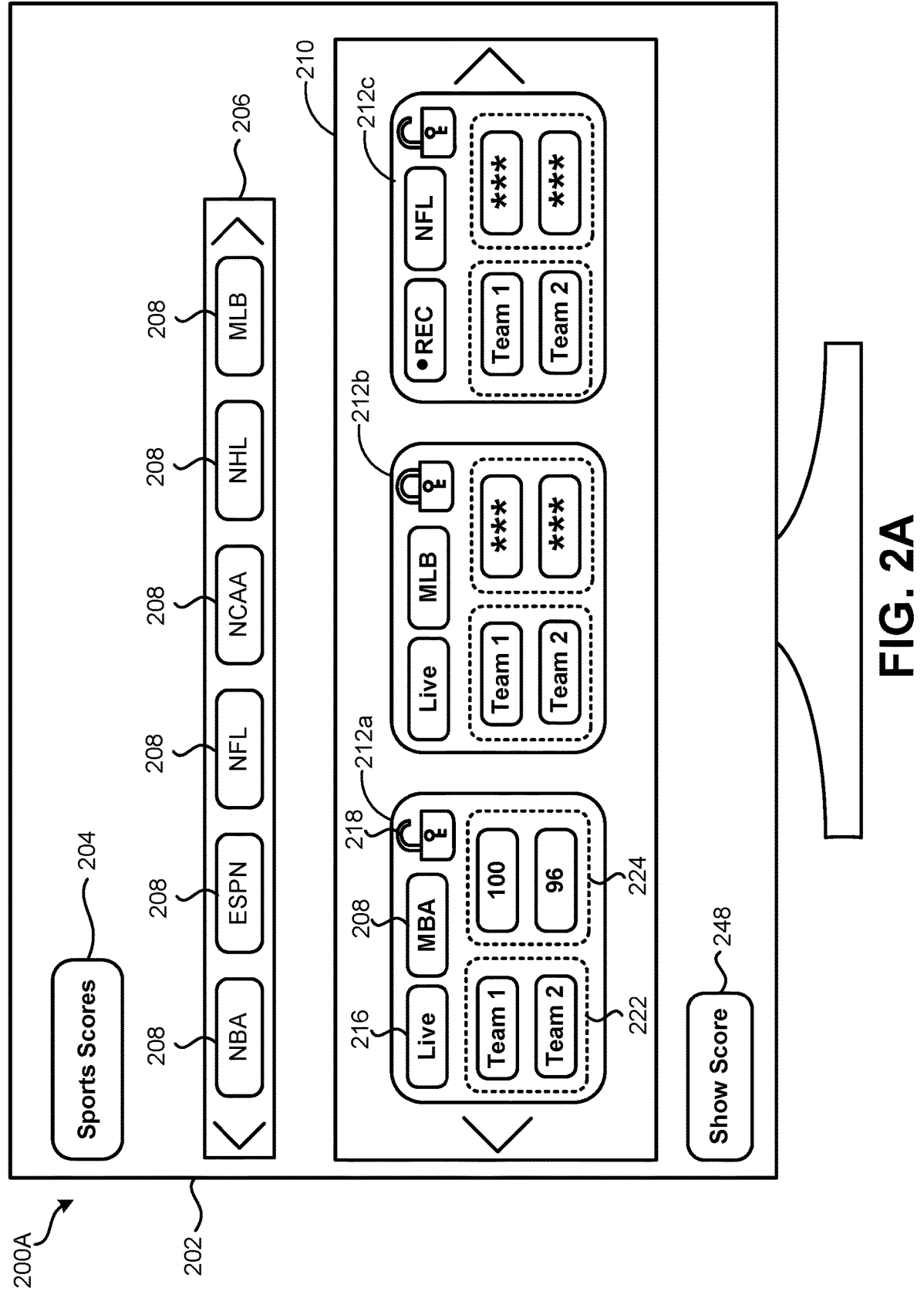

As illustrated in FIG. 2A, in an example scoreboard 212a, the gate status indicator 216 indicates a live status of the game; the channel name 208 indicates that the game is an NBA game; the accessibility indicator 218 shows an unlock status (i.e., accessible by the viewer); the team section 222 shows the participating teams 1 and 2, and the score section 224 shows the real-time score (e.g., 100:96) between teams 1 and 2. In scoreboard 212a, the scores are displayed and thus are spoiled for the users.

In the example scoreboard 212b, a spoiler prevention feature or function is enabled. For example, the score section 224 is entirely blocked out and the scores are hidden from presentation to the users. The enablement of spoiler prevention feature may be set as default based on a determination that the user is not entitled to the content of the sport program (e.g., the user is not subscribed). In some embodiments, an option to purchase the content of the sport program may be provided to the user, for example, by the program guide server 106. After the user buys the content of the sport program and is entitled to its content, the spoiler prevention is suspended for that sport game and the score section is revealed to the qualified/authorized user. In some embodiments, an option may be provided to the user to enable/disable the spoil prevention feature in the scoreboard, regardless of whether the user is entitled to the content of the sport program.

In the example scoreboard 212c, the game status indicator 216 indicates that the content of the sport program is being recorded, and the spoiler prevention feature is enabled to block out the score section. In some embodiments, an option to enable the spoiler prevention feature is provided to the user, so that the user may choose to block out the scores when the recording is started. In some embodiments, spoiler prevention is automatically enabled and triggered by the initiation of recording. The spoiler prevention may be enabled through the entire recording of the sport program. In this way, when a user is recording the sport program while browsing the programs of the program listing 210, the score section of the sport program being recorded by the user is not exposed to the user. In some embodiments, recording of the sport program may be initiated after the initiation of the sport of the program, and the spoiler prevention may be enabled at the beginning of the recording.

In some embodiments, the program guide user interface 200A further includes a spoiler toggle 248. The spoiler can be implemented as a graphical button or switch within the program guide user interface 200A, allowing users to easily switch between spoiler-enabled mode and spoiler-disabled mode. When enabled, the spoiler prevention feature hides the scores and other potentially revealing information in the program preview board, while disabling or suspending the spoiler prevention feature reveals the scores and displays the information normally in the program preview board.

Figure 2B:
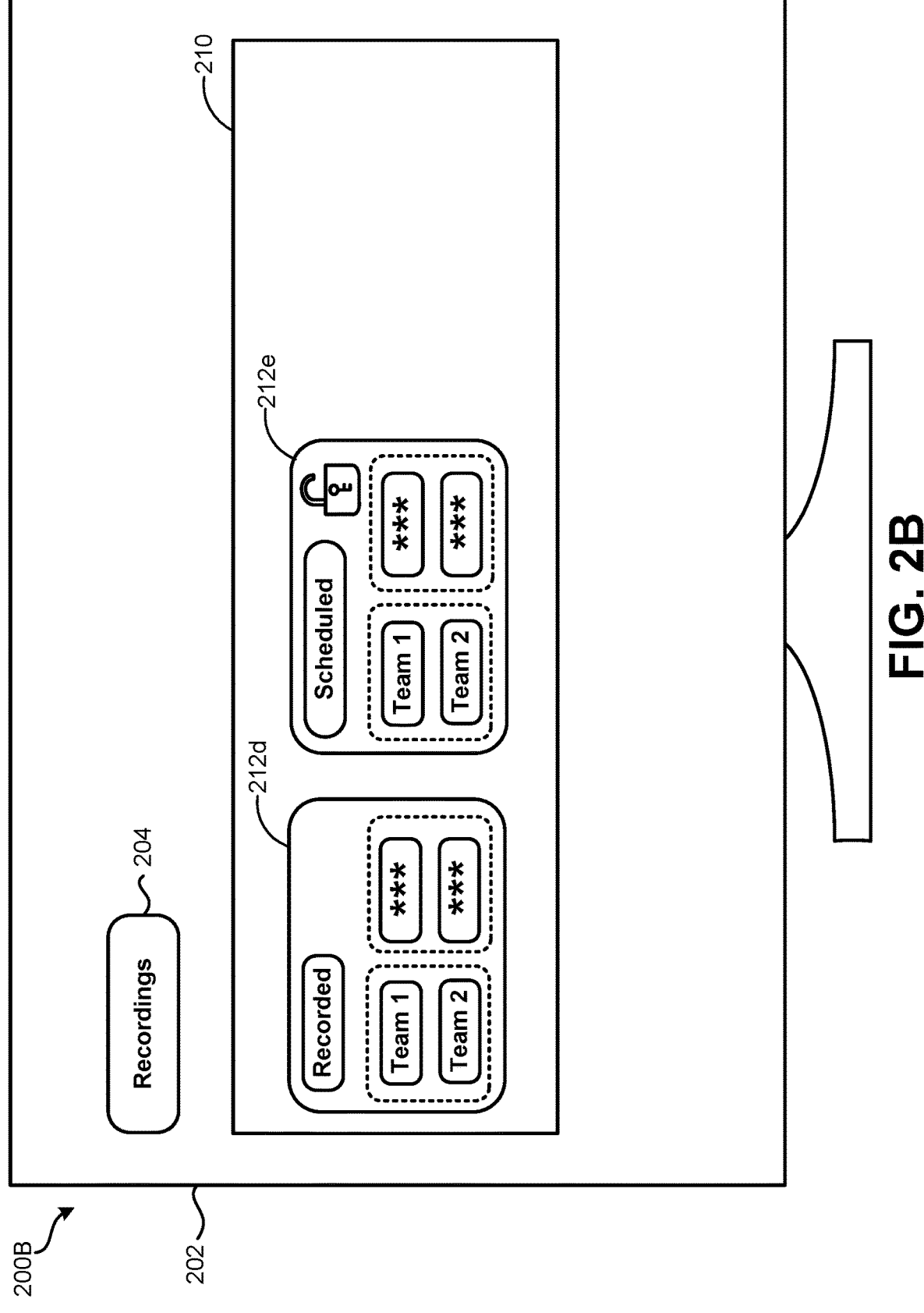

FIG. 2B is a schematic diagram illustrating a screenshot of another example user interface 200B, according to various embodiments. In the illustrated program guide user interface 200B, the program listing title 204 indicates that the programs included in the home page 202 include recorded programs of the finished sport programs. A few more examples of the scoreboard 212d and 212e included in the second program listing 210. In the illustrated example, the scoreboard 212e shows information of a recorded program (i.e., a finished sport). The spoiler prevention feature is enabled to block out the score section 224 of the scoreboard 212e even after the sport is finished. The spoiler prevention may not be disabled or suspended until after the user completes viewing the recording of the sport program. Similarly, the example scoreboard 212e shows a scheduled recording of a not-yet-started sport program, and the spoiler prevention is enabled to block out the score section 224 until after the recording is finished as well as the user completes viewing the recording of that sport program.

Figure 2C:
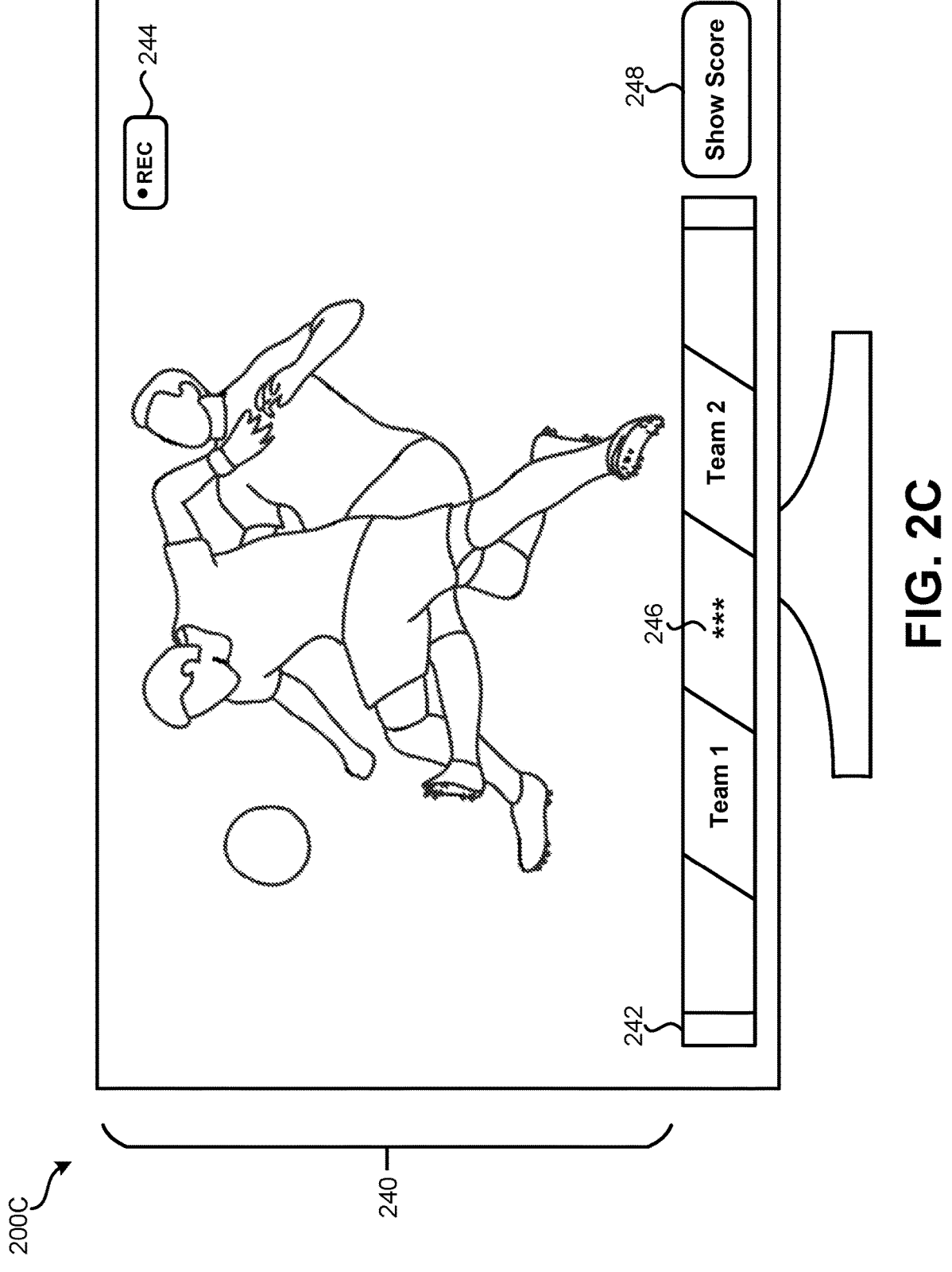
Figure 2C:
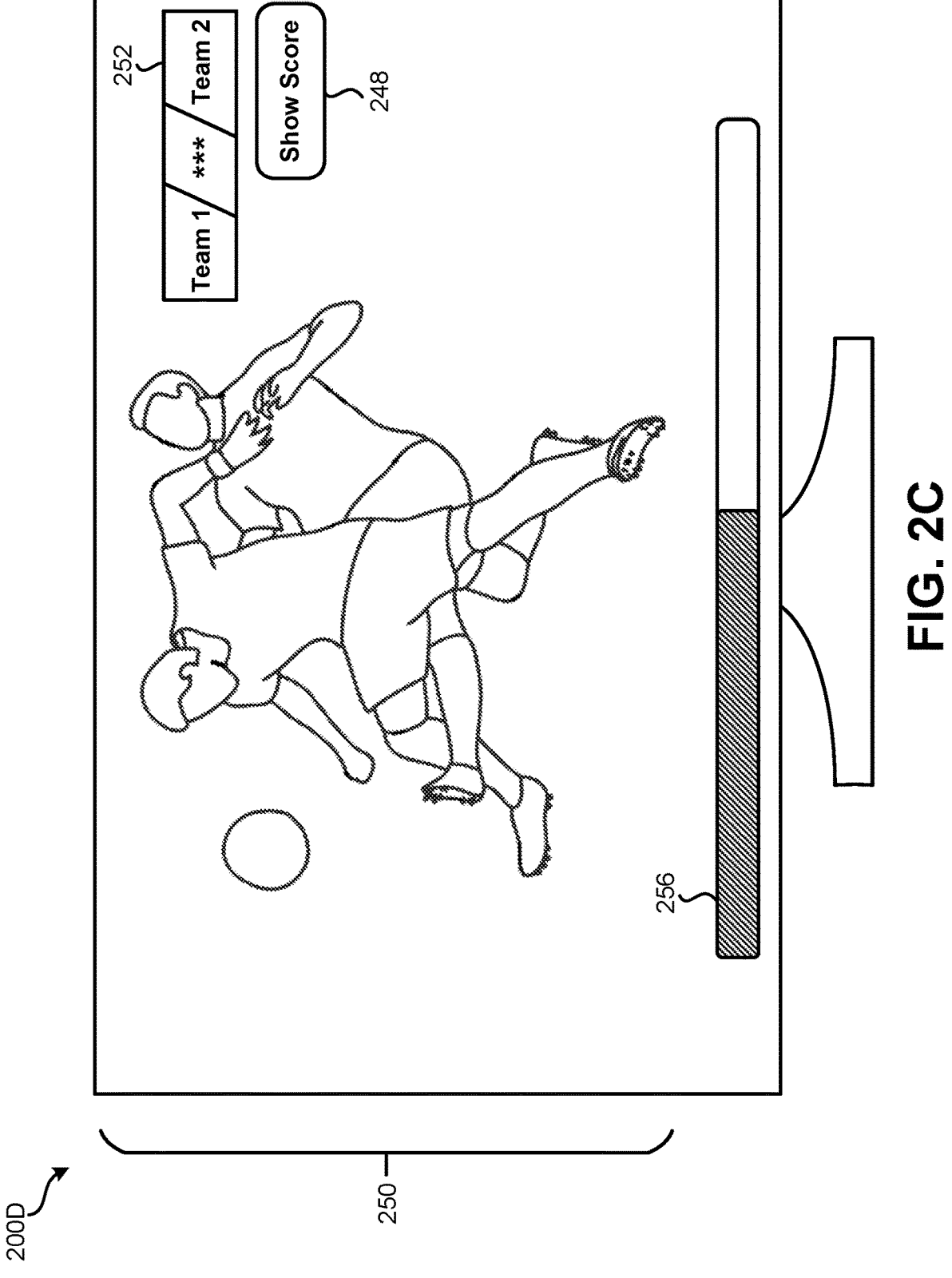

FIG. 2C is a schematic diagram illustrating another example screenshot of a program guide user interface 200C, according to various embodiments. In the illustrated program guide user interface 200C, a scoreboard 242 is overlaid onto program content 240, when the program content is being recorded, as indicated by the status indicator 244. The spoiler prevention feature can be enabled, such that the scores in the scoreboard 242 are blocked out during recording. In this arrangement, the program content can be presented to the user and concurrently recorded without exposure of the scores. When the user watches a portion of the content while the content is being recorded and then leaves the client device, the enabled spoiler prevention can keep safe the non-exposure of the score when the user returns to the client device. An option may be provided to the user to allow the user to enable the spoiler prevention even when the user is watches the recording if the user chooses so. The user has an option to timely and freely disable the spoiler prevention and reveal the score during recording of the program content and/or replaying of the recording, for example, through use of the spoiler toggle 248. As mentioned above, when enabled by the spoiler toggle 248, the spoiler prevention feature is enabled to hide the scores and other potentially revealing information in the presenting content of the program being recorded, while disabling the spoiler prevention feature reveals the scores and displays the information normally in the currently presenting content of the program being recorded.

FIG. 2D is a schematic diagram illustrating a screenshot of another example of user interface 200D, according to various embodiments. In the illustrated program guide user interface 200D, a scoreboard 242 is overlaid onto program content 250 of a recorded program (i.e., a recorded sport game), when the program content 250 is being played on the client device 110, as indicated by the progress bar 256. The spoiler prevention feature can be enabled, such that the scores in the scoreboard 252 are blocked out during presentation of the recorded content to the user. In this arrangement, the program content can be presented to the user for the user to view without exposure of the scores. Similarly, the user has an option to timely and freely disable the spoiler prevention and reveal the score during recording of the program content and/or replaying of the recorded program, for example, through the spoiler toggle 248, as mentioned above. The various features and functions shown in FIGS. 2A-2D may be performed by hardware, software, firmware, or other programmable instructions stored within and executed by the various components of FIG. 1, as appropriate.

Figure 3A:
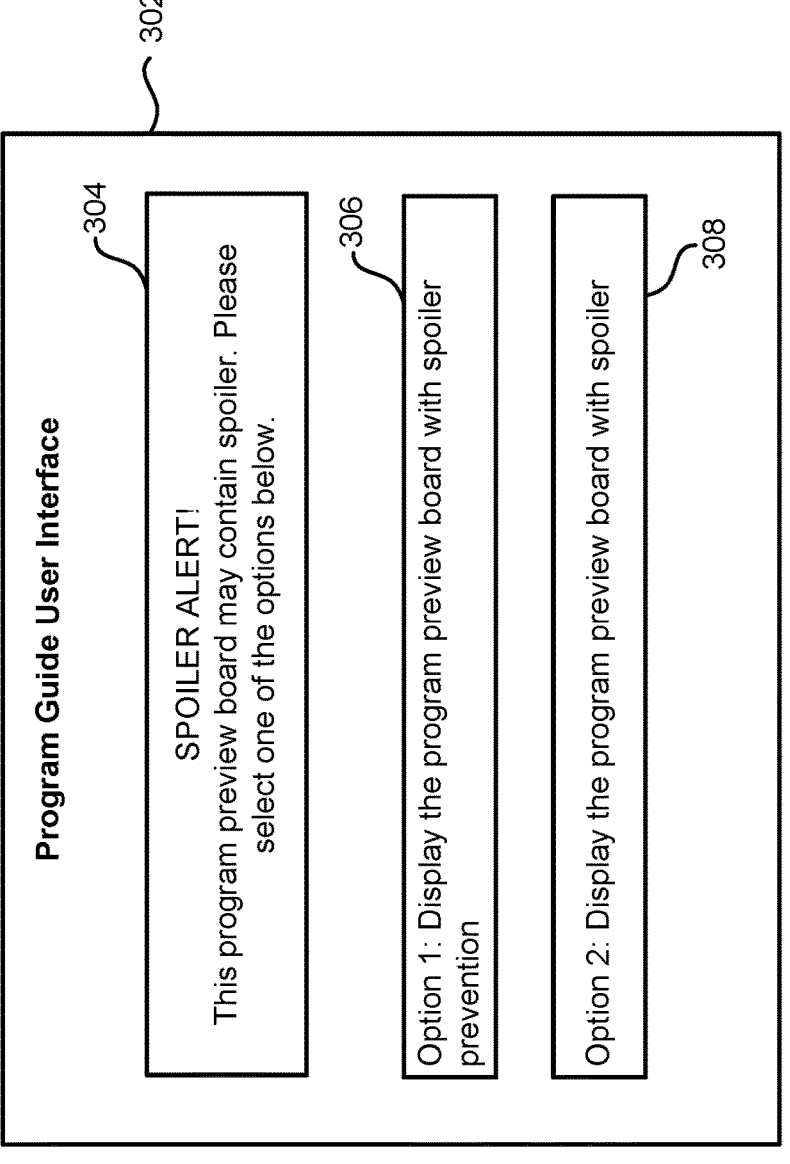

FIG. 3A is a schematic diagram illustrating a program preview user interface 300A, according to various embodiments. The program preview user interface 300A may be displayed in response to a user issuing a request to record a program or schedule a recording of a program. For example, the program guide server 106 and/or the content receiver 109 may generate data corresponding to the program preview user interface 300A that is provided to the client device 110 for displaying.

The program preview user interface 300A includes a display area 302 on which a display area 304 is displayed. The display area 304 will include a message that warns the user that the program preview board (e.g., a scoreboard) she selects contains spoiler (e.g., scores of a sport program to be recorded). The program preview user interface 300A also includes a selectable area 306 that the user can select to indicate that she would like the program preview board to be displayed with protection from spoiler (e.g., with scores blocked out in a scoreboard). Additionally, the program preview user interface 300A includes a selectable area 308 that the user can select to indicate that she would like the program preview board to be displayed with disablement of spoiler prevention (e.g., scores displayed in a scoreboard), for example, from the beginning of the program.

In some embodiments, the program preview user interface 300A may be much simpler and be a two-screen presentation. For example, if a user is watching a program and initiating recording, the selectable spoiler interface input corresponding to the display area 302 can then appear on the screen and give the user the option to check the box to protect from spoilers (e.g., display of scores in scoreboard 212, 242, or 252). Similarly, if the user is viewing the program guide user interface 200A and selects a program to record, a dialog box (e.g., the spoiler interface input) corresponding to the display area 302 can then appear or pop up and ask whether the user wishes to protect this program preview board from spoilers.

FIG. 3B is a schematic diagram illustrating a recording parameter user interface 300B, according to various embodiments. The recording parameter user interface 300B may be displayed in response to a user issuing a request to schedule a recording of a program. The user interface 300B may include a display area 312 in which the name or other identifier of the program (e.g., a sport program) to be recorded is displayed, a display area 314 in which the channel on which the program will be broadcast is displayed, a display area 316 in which the scheduled start date and time of the program are displayed, a display area 318 in which the scheduled end date and time of the program are displayed. One or more of the display areas 312-318 may be text entry areas that the user can select and enter the information that is displayed using an input device (e.g., remote control) connected to the client device 110. Additionally or alternatively, one or more of the display areas 312-318 may be populated automatically in response to a user using an input device to select the title of the program from the program listing 210, for example.

The user interface 300B also may include a selectable spoiler interface input 320 that would appear on display device 112 that a user can use an input device (e.g., remote control) to select. For example, the selectable spoiler interface input 320 may be a check box the user may select to indicate that the user is to be protected from spoilers (e.g., the score of a sport program) for the program being scheduled for recording. The selectable user interface input 320 may display a visual indication 322 (e.g., a check mark) after the user selects spoiler protection to provide confirmation that the user is to be protected from spoilers for the program being scheduled for recording. The user interface 300B also may include a selectable user interface input 324 that the user may select to indicate that scheduling of the recording of the program is to be canceled. Additionally, the user interface 300B may include a selectable user interface input 326 that the user may select to indicate that the information entered or displayed via the user interface 300B is to be used to schedule the recording of the selected program.

In some embodiments, the spoiler interface may be a two-screen presentation. For example, if a user is watching a program and initiating recording, the selectable spoiler interface input 320 can then appear on the screen and give the user the option to check the box to protect from spoilers (e.g., display of scores in scoreboard 212, 242, or 252).

Similarly, if the user is viewing the program guide interface 200A and selects a future program to record, a dialog box can then appear or pop up and ask whether the user wishes to protect this program from spoilers.

Figure 3C:
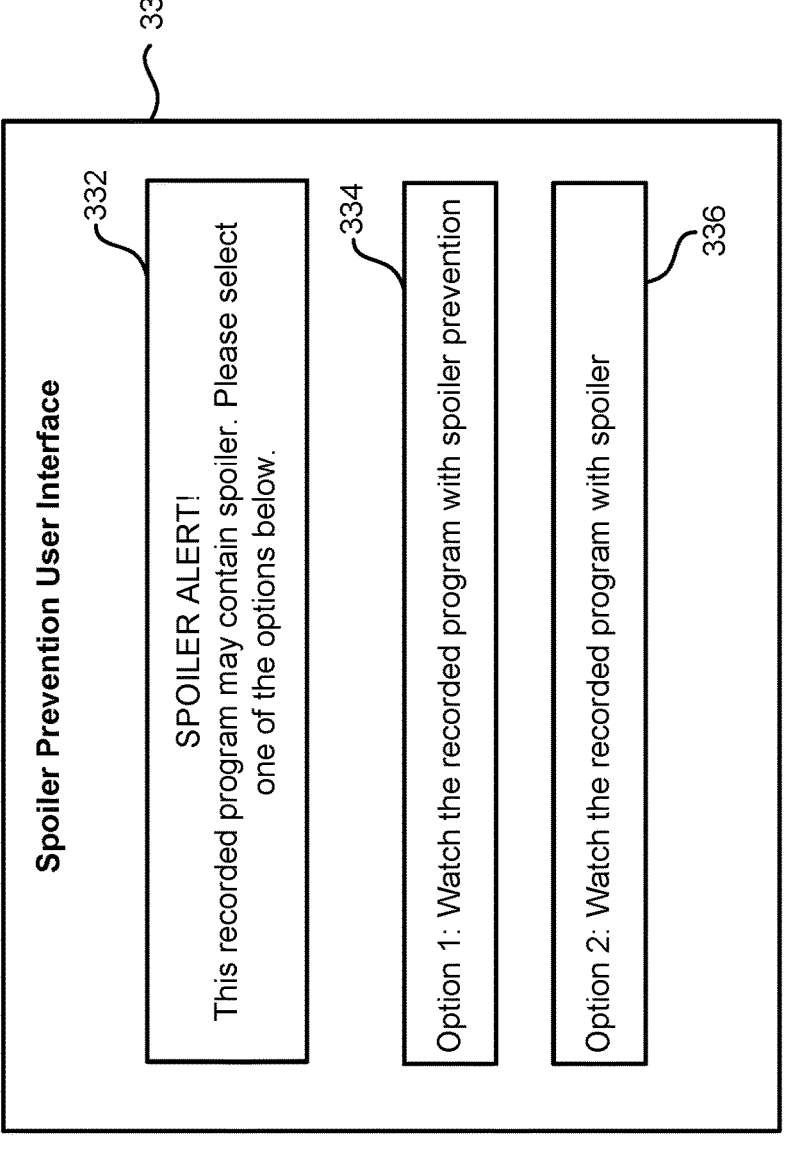

FIG. 3C is a schematic diagram illustrating a spoiler prevention user interface 300C, according to various embodiments. The program guide server 106 and/or the content receiver 109 may output data corresponding to the protection from spoiler prevention user interface 300C to the client device 110 for displaying when a user attempts to view a recorded program broadcast on a channel, after the user the program has been recorded. The spoiler prevention user interface 300C includes a display area 330 on which a display area 332 is displayed. The display area 332 will include a message that warns the user that the recorded program she selects contains spoiler (e.g., scores of a recorded sport program). The spoiler prevention user interface 300C also includes a selectable area 334 that the user can select to indicate that she would like to watch the recorded program with protection from spoiler (e.g., with scores blocked out). Additionally, the spoiler prevention user interface 300C includes a selectable area 336 that the user can select to indicate that she would like to watch the recording that has been protected from spoilers, for example, from the beginning of the program.

FIG. 4 is a flow diagram illustrating an example method 400 for spoiler prevention according to various embodiments. The method 400 may be performed by one or more components of the system illustrated by FIG. 1, such as the program guide server 106, the client device 110, and the content receiver 109. Depending on the implementation, the method 400 may include additional, fewer, or alternative steps performed in various orders or in parallel.

At 402, a user request for viewing a program guide is sent from a client device and received at the program guide server. In some embodiments, a user request is sent when the user launches the program guide application in the client device. At 404, in response to the user request, a program guide is generated or activated and the data corresponding to the program guide is transmitted to the client event to allow the user to view the program guide in a user interface on the client device. The program guide user interface may include a home page that includes a first program listing (i.e., a first ribbon) and a second program listing (i.e., a second ribbon) as visual components displayed on the program guide user interface. For example, the first program listing includes a scrollable listing of available channels which, when selected by the user, reveal a deeper level of detail in the second (lower or subsequent) program listing. The second program listing includes a scrollable sequence of individual program preview boards. In some embodiments, the program preview board is a scoreboard displaying information related to a sport program or event.

At 406, a selectable option is provided to the user. The selectable option may be in a form of a pop-up window, a dialog box, or other suitable form in the program guide user interface. The selectable option allows the user to enable or disable spoiler prevention. In some embodiments, the selectable option includes an option for the user to enable spoiler prevention in the program preview board. In some embodiments, the selectable option includes an option for the user to disable spoiler prevention in the program preview board. For example, the selectable option may include an option for the user to block out the score in a scoreboard for a sport program or event. The selectable option may further allow the user to set duration of spoiler prevention. For example, the user may select to block out the score in the scoreboard before the sport program begins, throughout the sport program, after the sport program is completed, or during a specific period of time at the user's selection. Likewise, the selectable option may further allow the user to disable spoiler prevention for a program preview board. A spoiler toggle may also be provided in the program guide user interface as a part of the selectable option for the user to freely toggle the spoiler setting.

At 408, a user input indicating a selection of the spoiler prevention in a program preview board is sent from the client device and received at the program guide server. At 412, in response, the spoiler prevention is enabled in the selected program preview board. In some embodiments, spoiler prevention may be enabled by apply a spoiler prevention logic to manipulate the virtual display of scores in the scoreboard. For example, actual or real-time scores can be overlaid or replaced with a placeholder or obscured content, such as question marks, dashes, symbols, or blank spaces. In some embodiments, at least a part of the information related to the program is hidden. For example, the score (e.g., real-time or final score) of a sport program is blocked out in the score section of the scoreboard associated with the sport program.

On the other hand, at 410, a user input indicating disablement of spoiler prevention in a selected program board is sent from the client device and received at the program guide server. At 414, in response, the spoiler prevention is disabled or suspended in the selected program preview board. As an example, the actual or real-time scores are revealed and displayed in the scoreboard.

FIG. 5 is a flow diagram illustrating an example method 500 for spoiler prevention according to various embodiments. Depending on the implementation, the method 500 may include additional, fewer, or alternative steps performed in various orders or in parallel. Operations of the method 500 may be combined with operations of other methods described herein in parallel or in sequence.

At 502, a first user request for viewing a program guide is sent from a client device is received at the program guide server. At 504, in response to the user request, a program guide user interface is generated or activated and presented on the client device. Similarly, the program guide user interface may include a program listing that further includes a scrollable sequence of individual program preview boards (e.g., a scoreboard displaying information about a sport program or event). At 506, a second user request for recording a program is sent from the client device received at the program guide server. In some embodiments, a determination is made on whether the user is entitled to the content of the requested program. If the user is not entitled, a purchase option may be provided to the user to purchase the content of the program. If the user is entitled, the method 500 proceeds to 508.

At 508, a selectable option is provided to the user to allow the user to enable or disable spoiler prevention. The selectable option may include an option for the user to block out the score in a scoreboard for a sport program or event when the recording of the sport program starts and throughout the entire recording. The selectable option may also include an option for the user to disable spoiler prevention in the scoreboard so that actual or real-time scores are displayed in the scoreboard and timely updated during the recording.

At 510, a user input indicating the enablement of spoiler prevention in a selected program preview board during recording is sent from the client device and received at the program guide server. At 514, in response, the spoiler prevention is enabled in the selected program preview board during the time the program is being recorded. For example, when recording a sport program of a sport game or event is scheduled or initiated, enablement of the spoiler prevention feature is triggered to prevent exposure of scores in the scoreboard during the time when the sport program is being recorded. In some embodiments, when the recording is finished, the scores may remain continuously hidden in the scoreboard until after an indication that the content of recorded program has been viewed by the user.

On the other hand, at 512, a user input indicating the disablement of spoiler prevention in a selected program preview board during recording is sent from the client device and received at the program guide server. At 516, in response, the spoiler prevention is disabled or suspended in the selected program preview board during recording of the program. For example, actual or real-time scores are displayed on the scoreboard and are timely updated.

Figure 6:
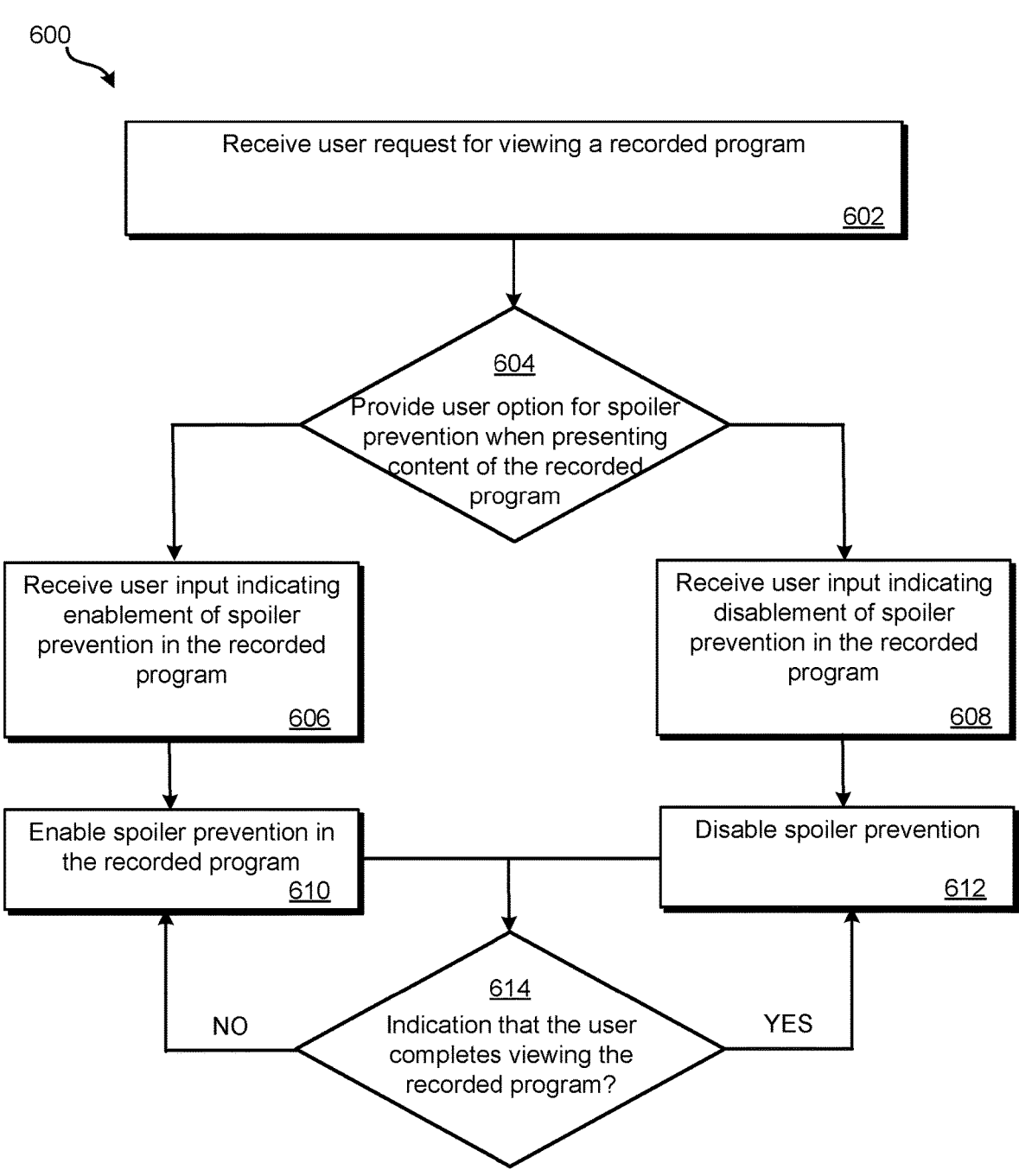
FIG. 6 is a flow diagram illustrating yet another example method for spoiler prevention, according to various embodiments.

FIG. 6 is a flow diagram illustrating an example method 600 for spoiler prevention according to various embodiments. Depending on the implementation, the method 600 may include additional, fewer, or alternative steps performed in various orders or in parallel. Operations of the method 600 may be combined with operations of other methods described herein in parallel or in sequence.

At 602, a user request for viewing a recorded program is received at the program guide server. The recorded program may be saved in storage connected to the program guide server, and a program preview board for the recorded program may be included in the program listing of the program guide user interface. The spoiler prevention feature has been enabled in both the recorded program and the program preview board of the recorded program. In some embodiments, the recorded program is a sport program, and the scores are blocked out in the scoreboard in the program list of the program guide user interface and the recorded program.

At 604, a selectable option is provided to the user to allow the user to enable or disable spoiler prevention when viewing the content of the recorded program. The selectable option may include an option for the user to block out the score in a scoreboard overlaid on the program content on the screen presented for the user. The selectable option may also include an option for the user to disable spoiler prevention in the scoreboard so that actual or real-time scores are displayed in the scoreboard and timely updated during the time the user views the program content of the recorded program.

At 606, a user input indicating the enablement of spoiler prevention in a recorded program selected by the user to view is received at the program guide server. At 610, in response, the spoiler prevention is enabled in the user interface during the time when the user is viewing the content of the recorded program. For example, when the user selects a recorded sport program of a sport game or event and is viewing the recorded sport program, enablement of the spoiler prevention feature is triggered to prevent exposure of scores in the scoreboard during the time when the recorded sport program is being played and presented to the user.

On the other hand, at 608, a user input indicating the disablement of spoiler prevention in a recorded program selected by the user to view is received at the program guide server. At 614, in response, the spoiler prevention is disabled or suspended in the user interface during the time when the user is viewing the content of the recorded program.

At 614, a determination is made on whether the user completes viewing the recorded program. The spoiler prevention feature may remain enabled upon an indication that the user has not completed viewing the content of the recorded program. On the other hand, upon an indication that the user has completed viewing the content, the spoiler prevention feature may be automatically suspended to expose the spoiler in the recorded program and/or the program preview board.

Figure 7:
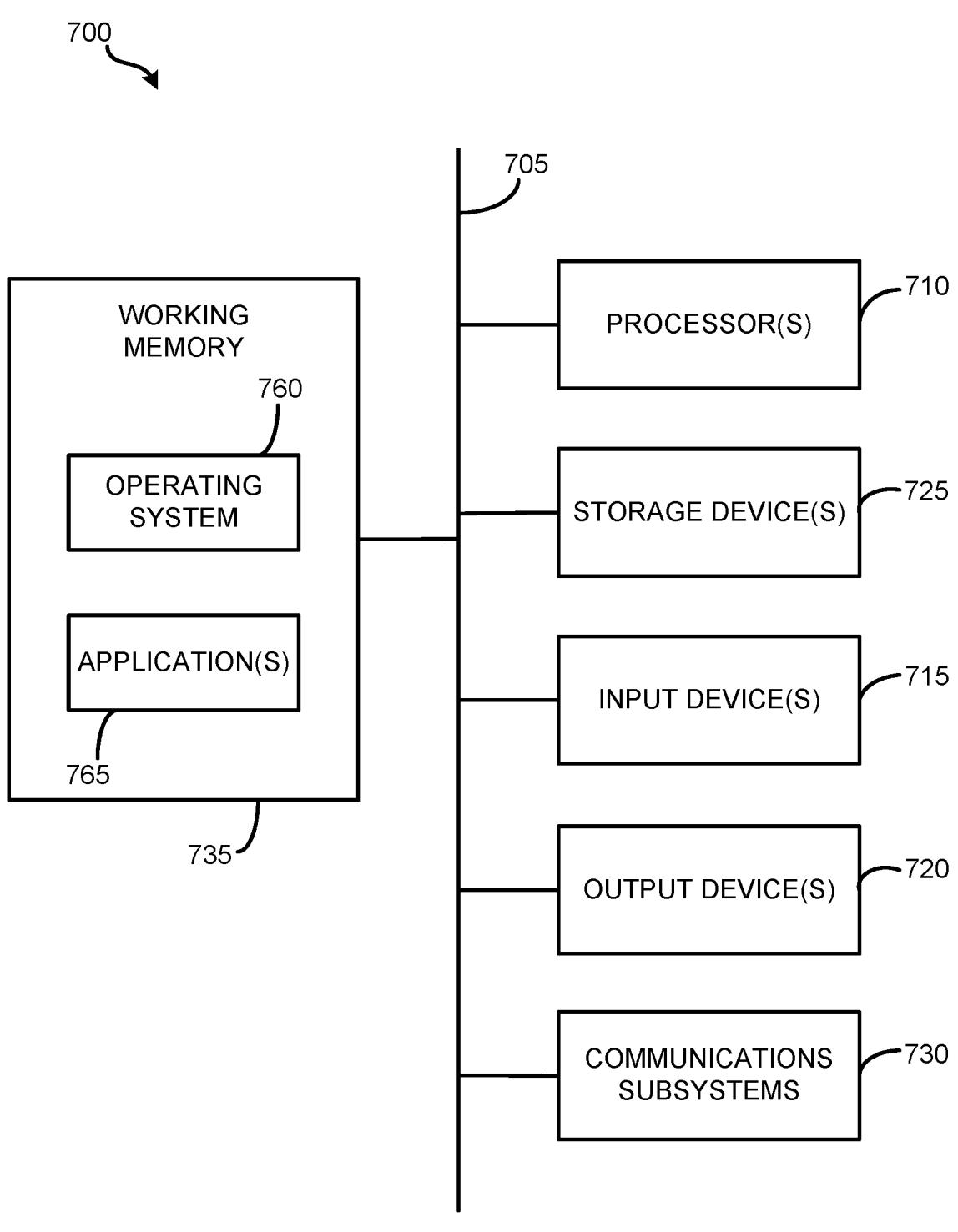
FIG. 7 is a schematic diagram illustrating an embodiment of a computer system according to various embodiments.

FIG. 7 is a schematic diagram illustrating an example of computer system 700. The computer system 700 is a simplified computer system that can be used to implement various embodiments described and illustrated herein. A computer system 700 as illustrated in FIG. 7 may be incorporated into devices such as a portable electronic device, mobile phone, server grade machines, or other device as described herein. FIG. 7 provides a schematic illustration of one embodiment of a computer system 700 that can perform some or all of the steps of the methods and workflows provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown including hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g., the first electronic device, may be incorporated into the computer system 700, e.g., an electronic device as an input device 715. In some embodiments, the computer system 700 will further include a working memory 735, which can include a RAM or ROM device, as described above.

The computer system 700 also can include software elements, shown as being currently located within the working memory 735, including an operating system 760, device drivers, executable libraries, and/or other code, such as one or more application programs 765, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the operations of such methods are performed by the computer system 700 in response to processor 710 executing one or more sequences of one or more instructions, which might be incorporated into the operating system 760 and/or other code, such as an application program 765, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, solid state drive, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

While the present disclosure is made with respect to example SLINGTV® broadcast services and systems, it should be understood that many other content delivery and recording systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE) and integrated receiver/decoders (IRDs) as described below can be reallocated as desired without departing from the intended scope of the present disclosure.

Further, while the following disclosure is made with respect to the recording of program (e.g., television (TV), sport events, movies, music videos, etc.), it should be understood that the systems and methods disclosed herein could also be used for of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method, comprising:
receiving a first user request for browsing a program guide for digital programs on a client device;
in response to the first user request, transmitting data corresponding to the program guide to the client device;
displaying the program guide to allow the user to browse the program guide in a user interface of the client device, wherein the program guide comprises a plurality of program preview boards, each program preview board corresponding to a digital program or a recorded digital program and comprising information related to the digital program or the recorded digital program;
determining whether the client device is entitled to access the digital program;
in response to determining the client device is not entitled to access the digital program:
enabling a first spoiler prevention feature configured to hide at least a part of the information related to the digital program in the corresponding program preview board;
in response to determining that the client device is entitled to access the digital content:
providing a first selectable option for the user to enable or disable a first spoiler prevention feature; and
enabling or disabling the first spoiler prevention feature, based on the user's response to the first selectable option.

2. The method of claim 1, further comprising:
receiving a second user request for recording a digital program; and
enabling a second spoiler prevention feature, the second spoiler prevention feature configured to hide at least a part of the information related to the digital program in the corresponding program preview board when the digital program is being recorded.

3. The method of claim 2, wherein enabling the second spoiler prevention feature is automatically initiated when the recording of the digital program begins.

4. The method of claim 3, wherein the enablement of the second spoiler prevention feature endures throughout the recording of the digital program.

5. The method of claim 2, further comprising:
in response to the second user request, providing a second selectable option in the user interface for the user to enable or disable the second spoiler prevention feature, wherein the second spoiler prevention feature is enabled based on the user's selection of the second spoiler prevention feature.

6. The method of claim 2, further comprising:
generating a recorded program after the recording of the digital program is completed, wherein the second spoiler prevention feature is disabled after the recording of the digital program is completed.

7. The method of claim 6, further comprising:
receiving a third user request for playing the recorded program;
in response to the third user request, displaying content of the recorded program in the user interface;
providing a third selectable option for the user to enable or disable a third spoiler prevention feature, the third spoiler prevention feature configured to hide the part of the information related to the recorded program in the user interface when displaying the content of the recorded program; and
enabling the third spoiler prevention feature, based on the user's selection of the third spoiler prevention feature.

8. The method of claim 7, further comprising:

receiving a user input for disabling the third spoiler prevention feature; and in response to the user input, disabling the third spoiler prevention feature, based on the user's selection of the third spoiler prevention feature.

9. The method of claim 1, wherein the program preview board is a scoreboard, and the part of the information related to the program is a real-time score.

10. The method of claim 9, wherein the program is a sport event.

11. A system, comprising:

one or more processors; and a non-transitory computer-readable storage media storing computer-executable instructions that, when executed by the one or more processors, cause the system to:

receive a first user request for browsing a program guide for digital programs on a client device;

in response to the first user request, transmit data corresponding to the program guide to the client device;

display the program guide to allow the user to browse the program guide in a user interface, wherein the program guide comprises a plurality of program preview boards, each program preview board corresponding to a digital program or a recorded digital program and comprising information related to the digital program or the recorded digital program;

determine whether the client device is entitled to access the digital program;

in response to determining the client device is not entitled to access the digital program:

enable a first spoiler prevention feature configured to hide at least a part of the information related to the digital program in the corresponding program preview board;

in response to determining that the client device is entitled to access the digital content:

provide a first selectable option in the user interface for the user to enable or disable a first spoiler prevention feature; and enable or disable the first spoiler prevention feature, based on the user's response to the first selectable option.

12. The system of claim 11, wherein, the instructions when executed by the one or more processors further cause the system to:

receive a second user request for recording a digital program; and enable a second spoiler prevention feature, the second spoiler prevention feature configured to hide at least a part of the information related to the digital program in the corresponding program preview board when the digital program is being recorded.

13. The system of claim 12, wherein enabling the second spoiler prevention feature is automatically initiated when the recording of the digital program begins.

14. The system of claim 13, wherein the enablement of the second spoiler prevention feature endures throughout the recording of the digital program.

15. The system of claim 12, wherein, the instructions when executed by the one or more processors further cause the system to:

in response to the second user request, provide a second selectable option in the user interface for the user to enable or disable the second spoiler prevention feature, wherein the second spoiler prevention feature is enabled based on the user's selection of the second spoiler prevention feature.

16. The system of claim 15, wherein, the instructions when executed by the one or more processors further cause the system to:

generate a recorded program after the recording of the digital program is completed, wherein the second spoiler prevention feature is disabled after the recording of the digital program is completed.

17. The system of claim 16, wherein, the instructions when executed by the one or more processors further cause the system to:

receive a third user request for playing the recorded program;

in response to the third user request, display content of the recorded program in the user interface;

provide a third selectable option for the user to enable or disable a third spoiler prevention feature, the third spoiler prevention feature configured to hide the part of the information related to the recorded program in the user interface when displaying the content of the recorded program; and enable the third spoiler prevention feature, based on the user's selection of the third spoiler prevention feature.

18. The system of claim 17, wherein, the instructions when executed by the one or more processors further cause the system to:

receive a user input for disabling the third spoiler prevention feature; and in response to the user input, disable the third spoiler prevention feature, based on the user's selection of the third spoiler prevention feature.

19. The system of claim 11, wherein the program preview board is a scoreboard, and the part of the information related to the program is a real-time score.

20. The system of claim 19, wherein the program is a sport event.

* * * * *